April 8, 1930. A. W. HARRIS ET AL 1,754,190
WIRE TEMPERING APPARATUS
Filed April 23, 1928 5 Sheets-Sheet 3
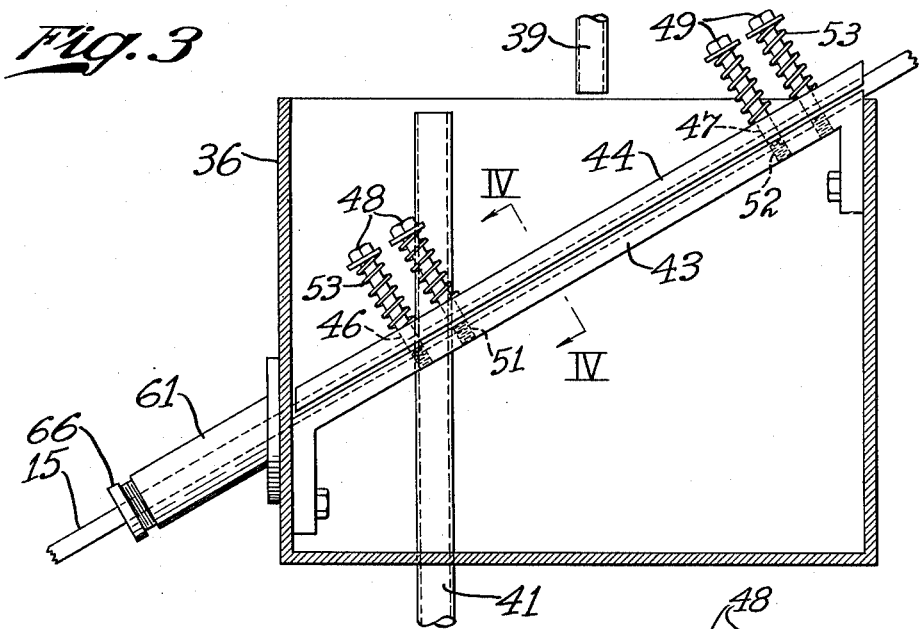
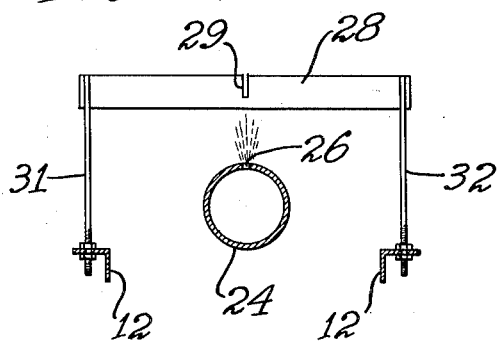
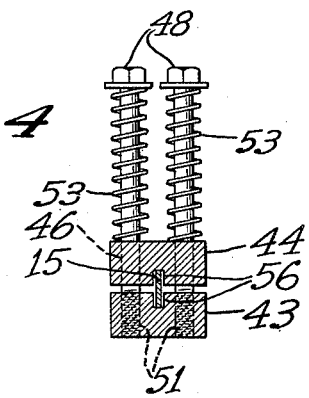
Inventors
A. W. Harris
F. M. Suchke
J. L. King
By Johnston & Jennings Attorneys April 8, 1930.  A. W. HARRIS ET AL  1,754,190
WIRE TEMPERING APPARATUS
Filed April 23, 1928  5 Sheets-Sheet 4
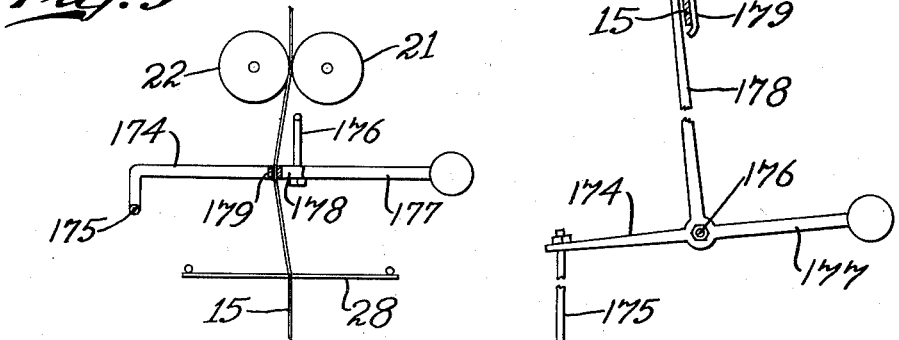
Fig. 9
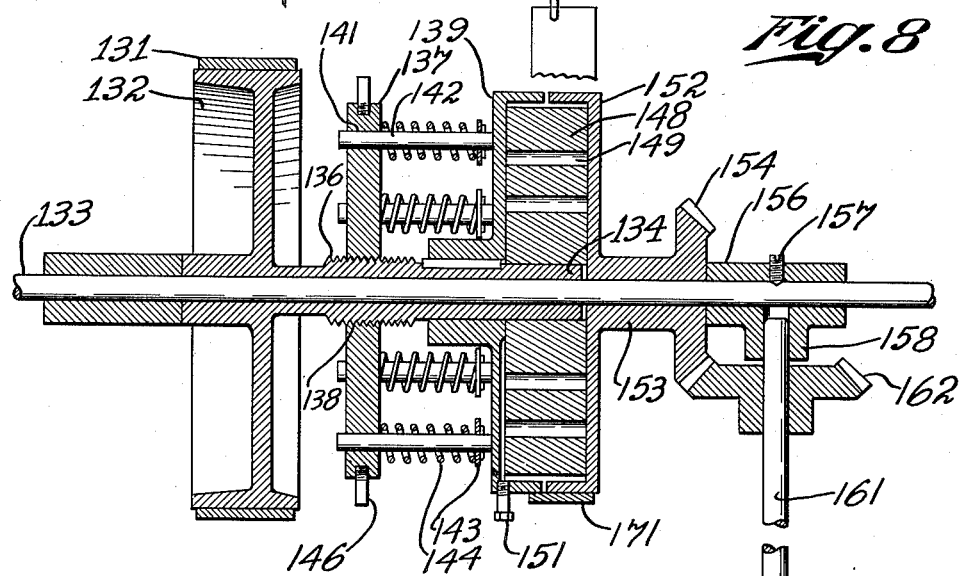
Fig. 8
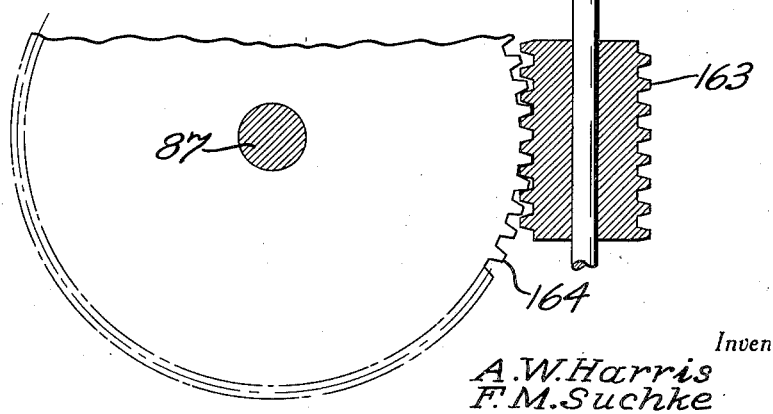
Inventors
A. W. Harris
F. M. Suchke
J. L. King
By Johnston & Jennings  Attorneys April 8, 1930. A. W. HARRIS ET AL 1,754,190
WIRE TEMPERING APPARATUS
Filed April 23, 1928 5 Sheets-Sheet 5

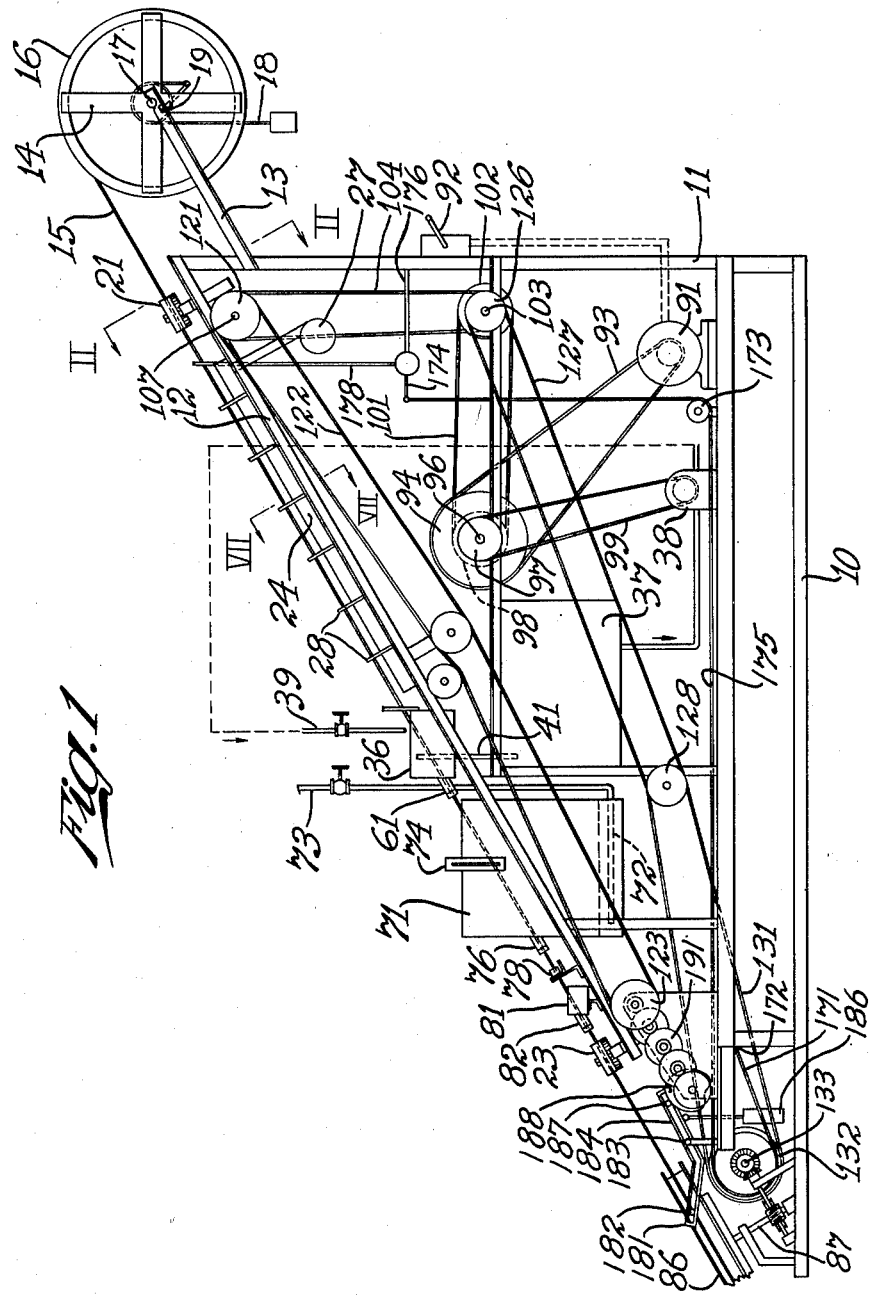

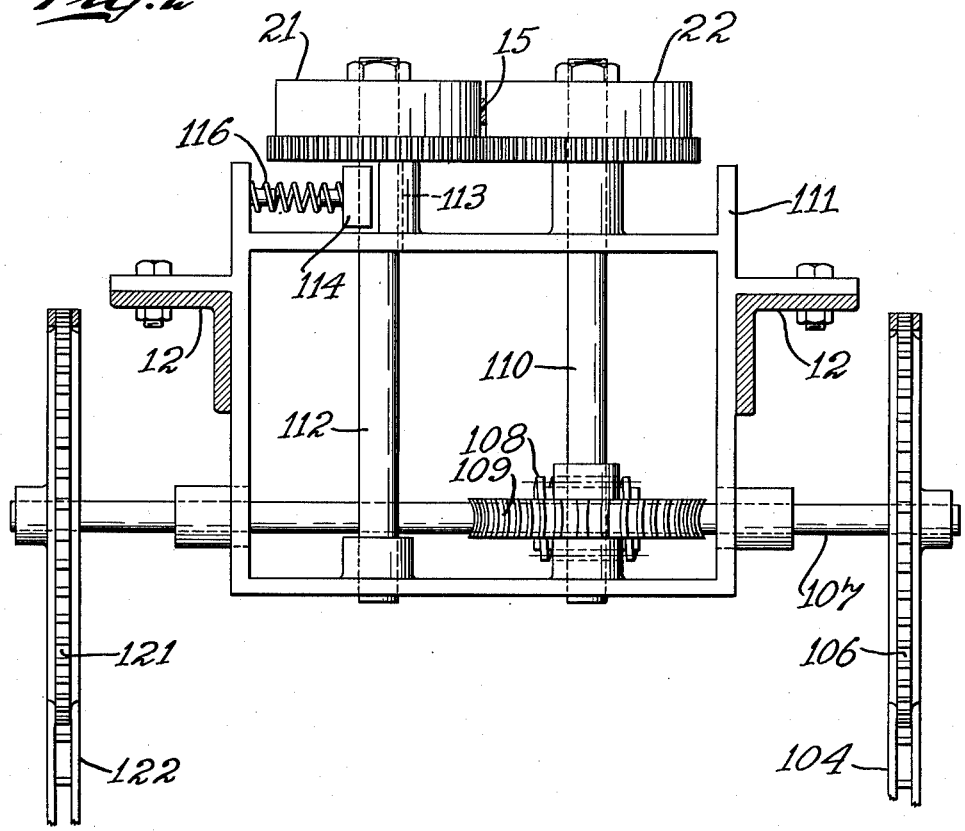
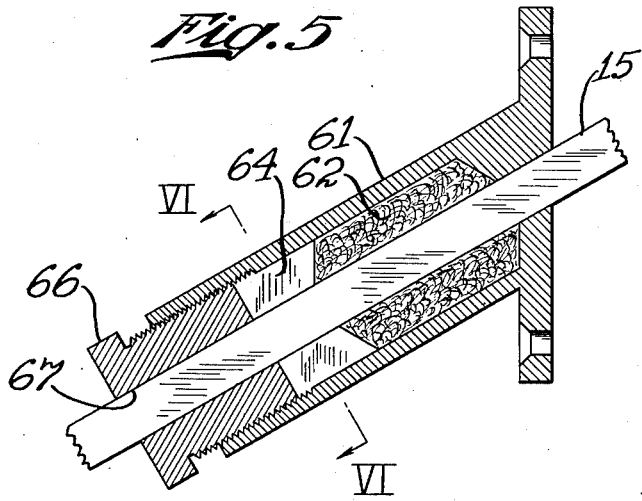
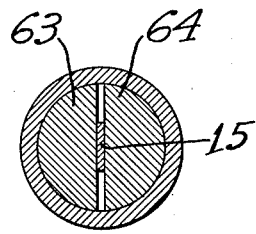

Inventors
A.W.Harris
F.M.Suchke
J.L.King
By
Johnston & Jennings Attorneys

Patented Apr. 8, 1930

1,754,190

UNITED STATES PATENT OFFICE

ARTHUR W. HARRIS, FREDERICK M. SUCHKE, AND JOHN L. KING, OF ATLANTA, GEORGIA, ASSIGNORS TO ATLANTA HARNESS & REED MANUFACTURING COMPANY, A CORPORATION OF GEORGIA

WIRE-TEMPERING APPARATUS

Application filed April 23, 1928. Serial No. 272,320.

Our invention relates to apparatus for the progressive tempering of wire and has for its object the provision of apparatus of the character designated which shall be simple of construction and operation and which shall insure a uniform treatment of the wire throughout its length.

A further object of our invention is to provide apparatus for the progressive tempering of flat wire such as is used in loom reeds and which shall be effective to temper such wire uniformly throughout and without distortion thereof during the process.

A still further object of our invention is to provide apparatus for the progressive tempering of flat reed wire and embodying means for progressively heating, quenching and tempering the wire, and which shall include a uniform rate of feed for the wire throughout its length during the treatment thereof.

A more specific object of our invention is to provide, in apparatus for the progressive tempering of flat reed wire, a quenching bath adjacent the heating means for the wire, means for applying tension to the wire while in the quenching bath and effective to maintain the wire against distortion during quenching, and a tempering bath through which the wire is drawn under tension after being quenched, together with means for maintaining the linear speed of the wire constant through the quenching and tempering baths.

In apparatus for the progressive tempering of wire wherein the wire is successively heated and quenched and then subjected to a tempering bath, in order to secure a uniformly treated product, it is essential that every part of the wire must be subjected to the same treatment and for the same length of time. It is furthermore important that the wire, while being tempered, be subjected to a uniform tension and that it be subjected to little or no tension while being heated prior to being tempered. In the tempering of flat wire for loom reeds, which wire is usually of rectangular cross section, it has been found extremely difficult to prevent distortion of the wire during heating and tempering and to provide a uniformly treated product.

All of the before mentioned desired objects are attained by means of our invention and we provide apparatus whereby flat reed wire may be progressively tempered and wherein each unit of the wire receives identical treatment. Furthermore, the wire while being treated is maintained against distortion and under constant tension during its treatment in the tempering bath. Briefly, our invention comprises a downwardly sloping frame having supporting means at one end thereof for a reel from which the wire is unwound and having at opposite ends thereof, respectively, feeding and delivery rolls followed by a winding reel upon which the tempering wire is wound. Disposed in succession along the frame are means for heating the wire to a desired temperature, a quenching bath and a tempering bath. The feeding and delivery reels are driven in synchronism by constant speed power means and the winding reel is so driven that the linear speed of the wire in its treatment is constant. Tension means are provided in the quenching tank to provide a uniform tension for the wire while in the tempering bath. The wire is so fed to the machine that it is somewhat slack and is subject to practically no tension while being heated, thereby avoiding stretching thereof when hot.

Apparatus embodying features of our invention is illustrated in the accompanying drawings forming a part of this application, wherein Fig. 1 is a view in side elevation of our improved wire tempering apparatus;

Fig. 2 is a sectional view of the feeder rolls, drawn to a larger scale than Fig. 1, and looking in the direction of the arrows II—II of Fig. 1;

Fig. 3 is a sectional view of the quenching tank employed with our invention and showing our improved tension device in side elevation;

Fig. 4 is a sectional view taken along the line IV—IV of Fig. 3;

Fig. 5 is a sectional view of the stuffing box leading from the lower end of the quenching tank shown in Fig. 3;

Fig. 6 is a sectional view taken along the line VI—VI of Fig. 5;

Fig. 7 is a sectional view across the frame of the apparatus taken along the line VII—VII of Fig. 1 and showing the guide means for maintaining the wire against distortion while heating;

Fig. 8 is a sectional view showing the friction clutch and driving means for operating the winding reel;

Fig. 9 is a detail view illustrating the means for operating the brake element associated with the friction clutch illustrated in Fig. 8.

Figure 10:
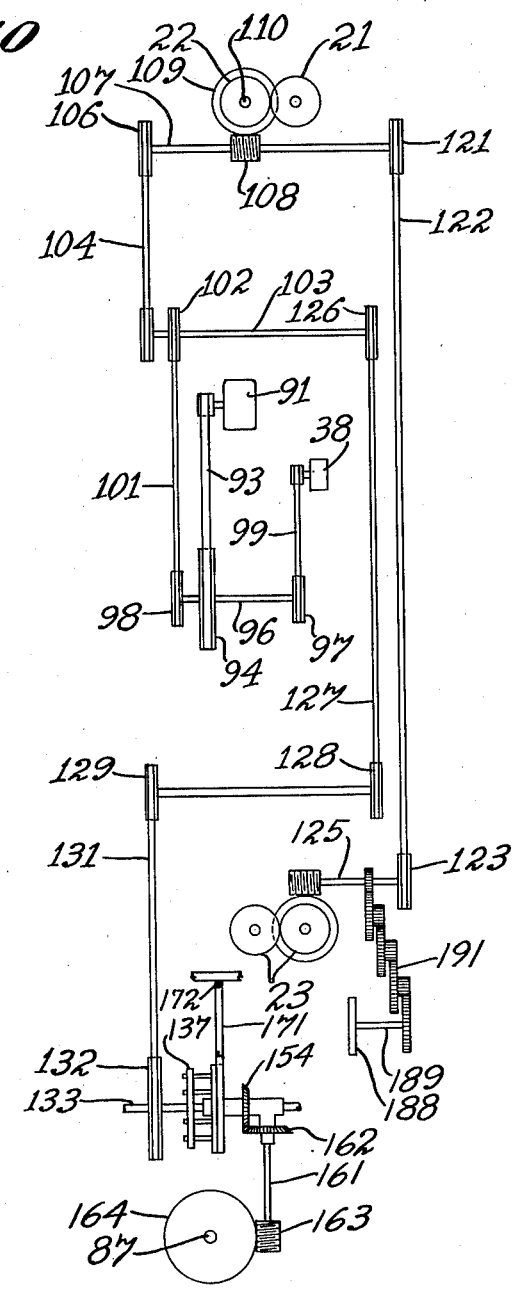
Fig. 10 is a diagrammatic plan view showing the operating means for the apparatus.

Referring now to the drawings for a better understanding of our invention, we show a frame embodying a base portion 10, a front upright portion 11 and an inclined upper portion 12. The frame may be constructed of any suitable material, preferably of steel structural members. At the front of the machine is mounted a bracket 13 in which is journaled a spider 14 arranged to support a reel 16 on which the wire 15 to be tempered is wound. The spider 14 has a hub 17. A weighted strap 18 having one end secured to the stationary member at 19 passes around the hub 17 and serves to retard the unwinding of the wire from the reel 16 sufficiently to prevent its becoming loose on the reel.

At the upper forward end of the frame are a pair of feeder rolls 21 and 22, which receive the wire 15 between them, shown more clearly in Fig. 2. A similar pair of delivery rolls 23 are provided at the lower rear end of the machine. Adjacent the feeder rolls 21 and 22 is an elongated burner 24 over which the wire passes. In the example shown, the burner 24 comprises a hollow member having a series of holes 26 therein and which is supplied with mixed gas and air from a blower 27. Arranged at intervals along the burner 24 are guides 28, see Fig. 7. Each of the guides 28 extends transversely of the burner 24 and has a notch 29 milled therein so as to maintain the wire straight and edgewise of the burner while being heated. The guides 28 are provided at their sides with adjustable supports 31 and 32.

Adjacent the burner 24 is a quenching tank 36 through which the wire next passes. The quenching tank is supplied with oil from a reservoir 37 by means of a pump 38 and a conduit 39 and is supplied with an overflow pipe 41 leading to the reservoir 37 whereby the level of the oil in the quenching tank is maintained constant. The conduit 39, leading from the pump 38 to the tank 36, should be of sufficient length or should be otherwise so arranged that the oil is thoroughly cooled before passing from the reservoir 37 to the quenching tank.

Within the quenching tank 36 is a tension device extending from end to end of the tank and comprising a lower bar member 43 and an upper bar member 44. The upper bar member is provided with holes 46 at the lower end thereof and holes 47 at the upper end thereof through which similar screws 48 and 49 readily pass. The lower bar member 43 is provided with threaded holes 51 and 52 to receive the screws 48 and 49 and springs 53 are provided between the screw heads and the upper bar 44 to press the upper bar downwardly. Each of the bars 43 and 44 is provided with a similar milled groove 56 only slightly greater in width than the thickness of the wire 15. It will be seen with this arrangement that the heated wire while in the quenching tank is suddenly cooled without any distortion and that by adjustment of the screws 48 and 49 the desired tension may be placed thereupon.

At the lower end of the quenching tank 36 is a stuffing box 61 which is shown in detail in Fig. 5. Within the stuffing box 61 is a packing chamber 62 packed with asbestos, or other suitable packing, and which is held in place by a pair of semi-cylindrical members 63 and 64 which lie snugly against the wire 15. The assembly is held together by means of a packing nut 66 having a circular opening 67 therein and which is screwed in against the members 63 and 64.

After leaving the quenching tank 36 the wire enters a tempering bath in a tank 71. The tempering bath in the tank 71 may comprise any suitable solution known to the art and is heated by means of a gas burner 72 supplied by means of a conduit 73. The tempering bath should be maintained at a substantially constant temperature and a thermometer 74 is provided therein whereby the operator may regulate the flame of the gas burner 72 to maintain it at such temperature.

At the lower end of the tank 71 is a stuffing box 76 similar to the stuffing box 61 already described and the description thereof need not be repeated. Adjacent the stuffing box 76 is a scraper 78 for cleaning the wire of any matter carried forward from the tempering solution. Following the scraper 78 is a small tank 81 having a stuffing box 82 on the lower side thereof. The tank 81 contains water for further cleaning the tempered wire.

After leaving the tank 81 the wire passes between the delivery rolls 23 and onto a winding reel 86 mounted on a spider similar to the spider 14 already described and driven by a shaft 87.

Our improved apparatus is operated by means of a constant speed motor 91 provided with the usual starting switch 92. The motor 91 drives through a belt 93 to a pulley 94 mounted on a shaft 96. Also mounted on the shaft 96 are two sprockets 97 and 98. A sprocket chain 99 leads from the sprocket 97 to the gear pump 38 to drive the latter. A sprocket chain 101 lends from the sprocket 98 to a sprocket 102 mounted on a shaft 103. Mounted on the shaft 103 are two other sprockets and a chain 104 from one of these sprockets leads to a sprocket 106 mounted on a shaft 107, the latter being mounted in the upper part of the frame of the apparatus.

The shaft 107 is provided with a worm 108 meshing with a gear 109, mounted on a vertical shaft 110 which carries the feed roller 22, see Fig. 2. The shaft 110 is suitably journaled in a frame 111 carried by the inclined upper portion 12 of the apparatus. The feed roller 21 is mounted on a shaft 112, journaled in the frame 111, but having considerable play therein as indicated at 113. A bearing 114 is mounted on the outer side of the shaft 112 and a spring 116 biases the bearing 114 against the shaft 112, so that the roller 21 is pushed toward the roller 22 and the wire 15 is tightly gripped between the rollers.

Mounted on the opposite end of the shaft 107 is a sprocket 121 carrying a chain 122 which leads to a sprocket 123 mounted on a shaft 125 and driving the delivery rolls 23. The delivery rolls 23 are driven similarly and are similar in details of operation to the feeding rolls. A repetition of the description thereof is therefore unnecessary. By the means just described, it will be seen that the feeding and delivery rolls are driven in synchronism.

Mounted on the shaft 103 is a second sprocket 126 carrying a chain 127 which leads to a sprocket 128 having a pulley 129 mounted thereon. A belt 131 leads from the pulley 129 to a pulley 132 from which the winding reel 86 is driven.

The mechanism for driving the winding reel 86 comprises one of the most important features of our invention and will now be described, referring particularly to Figs. 8 and 9. The pulley 132 is loosely mounted on a shaft 133 and is provided with an extended hub portion 134. The hub portion 134 is exteriorly threaded at 136 to accommodate a tension plate 137 having a threaded opening 138 therein fitting around the threaded portion 136. Splined to the hub portion 134 is a clutch member 139 so that the clutch member 139 is freely movable longitudinally of the hub portion 134. Provided in the tension plate 137 are a plurality of holes 141 through which pins 142 are loosely fitted. The outer ends of the pins 142 are provided with collars 143 and springs 144 are interposed between the collars 143 and the tension plate 137. Around the periphery of the tension plate 137 are a plurality of pins 146 by means of which the plate may be screwed in either direction on the hub portion 134 to increase or decrease the tension of the springs 144.

As shown, the clutch member 139 is cuplike in cross section and embraces a slotted disk 148 which may be made of fiber or other suitable material well known in the art. The disk 148 is provided with a plurality of holes 149 for the free passage of lubricant therethrough which may be supplied through a nipple 151. Mounted loosely on the shaft 133 is a second clutch member 152 similar to the clutch member 139 and facing oppositely to said member 139. The clutch member 152 is provided with an extended hub portion 153 carrying a beveled gear 154 and bearing against a stop 156 secured to the shaft 133 by means of a set screw 157. The stop 156 provides a bearing 158 for a shaft 161 extending at right angles to the shaft 133 and having secured thereto a beveled gear 162 which meshes with the gear 154. On the other end of the shaft 161 is a worm 163 which meshes with a gear 164 mounted on the shaft 87 which drives the winding reel 86.

It will be seen that, as the tempered wire is wound on the winding reel 86, each succeeding layer of wire will increase the diameter of the reel of wire and the linear speed of the wire would thereby be increased if the winding reel were driven at a constant angular speed. It will also be apparent that such operation would prevent all the wire being tempered from receiving the same treatment as to heating, quenching and tempering.

We accordingly provide a means whereby the angular speed of the winding reel 86 is varied so as to maintain the linear speed of the wire 15 constant. This latter means comprises a brake in the form of a strap 171 secured at 172 to the frame of the machine and extending around the clutch so as to bear principally on the clutch element 152. The strap 171 has connected thereto a small rope 175 which is carried forward toward the front of the machine over a pulley 173 to a lever 174 pivoted on a bolt 176 secured to the upright portion of the frame 11. The lever 174 is provided with a weighted arm 177 and a vertically extending arm 178, the latter being provided with an eye 179 through which is threaded the wire 15. The arm 178, as best seen in Figs. 1 and 9, is placed directly to the rear of the feed rollers 21 and 22 and is out of alignment with the guides 28.

The feed rolls 21 and 22 and delivery rolls 23, as has already been noted, are driven in synchronism and at a constant speed from a motor 91. The pulley 132, in driving the reel 86 however, must transmit its motion to the reel by reason of the frictional engagement of the clutch element 139 with the disk 148 and the frictional engagement of the latter with the clutch element 152, modified by the resistance offered by the brake strap 171 to movement of the clutch element 152. If the feed rolls 21 and 22 should feed the wire 15 faster than it is being wound on the reel 86, the lever arm 178 will be pushed more out of alignment, as seen in Fig. 9, thus slacking up on the rope 175 and the strap 171 and reducing relative movement between the clutch elements 139 and 152. This results in an increase in the angular speed of the reel 86 so that the wire is wound at the same rate that it is fed.

Should the speed of the winding reel 86 be increased to such an extent as to draw the wire 15 in winding through the delivery rolls 23 faster than it is being fed by the rolls 21 and 22, it tends to straighten the wire, where out of alignment, as seen in Fig. 9, and increase the tension of the rope 175 and strap 171 thus decreasing the rate at which motion is transmitted from the clutch member 139 to the clutch member 152. The action of the clutch can be nicely adjusted by means of the tension plate 137 so that the winding speed of the reel 86 is coordinated with the speed of the feed and delivery rolls, insuring a constant linear speed to the wire under treatment at all times and coordinated with the speed of the feeding and delivery rolls.

In order that the wire 15 shall be evenly wound on the reel 86 we provide a traverse arm 181 having a guide 182 bearing against the wire. The traverse arm 181 is pivoted at 183 and has one end 184 provided with a weight 186. A pin 187 provided on the arm 184 bears against a cam 188 mounted on a cam shaft 189 driven through a chain of reduction gearing 191 from the shaft 125. It will be seen, with this device, that the arm 181 moves from side to side of the reel 86 at each revolution of the cam 188, thus laying the wire evenly on the reel.

The operation of our improved apparatus is as follows:

The reel 16 for the wire to be treated is mounted on the spider 14 and the wire 15 is passed between the feed rolls 21 and 22, the eye 179 of the lever arm 178, and thence through the guides 28. From the guides 28 the wire 15 is threaded through the grooves 56 of the tension device in the quenching tank 36, thence through the stuffing box 61, the tempering bath and tank 71 through the delivery rolls 23 and on to the winding reel 26. The burner 24 is then started in operation to heat the wire which is started moving across the burner 24 through the quenching tank 36, the tempering tank 71 and on to the winding reel 86. The feed and delivery rolls are driven at a constant speed and the winding reel 86 is driven at such a speed, as has already been described, as to maintain the linear speed of the wire 15 constant. While over the heating burner 24, the wire is maintained edgewise to the burner by the slots 29 in the guides 28. Inasmuch as the tension means is located in the tank 36, the wire, while being heated, is slack and is under no tension. This is a very important feature of our invention because if the wire were under tension while hot it would tend to distort it. The provision of a downwardly sloping frame for the wire to travel over, permits the force of gravity to aid in feeding the wire while being heated, thus further avoiding tension on the wire at this point in its treatment.

Upon passing into the quenching tank 36 the wire is closely embraced in the grooves of the longitudinal bars 43 and 44 which maintain its symmetrical shape when subjected to the sudden cooling in the quenching tank. The tension springs 53 causing the bars 43 and 44 to be pressed toward each other and retard the movement of the wire 15, together with the constant speed linear pull on the wire exerted by the winding reel 86, insures a constant tension on the wire while in the tempering bath.

It will be seen, with our improved apparatus, that every portion of the wire automatically receives the same treatment as to heating, quenching and tempering. It will furthermore be appreciated that while this is done, there is no distortion of the wire, which feature is very important with flat wire for loom reeds, for which our improved apparatus is especially adapted. It will accordingly be apparent that we have devised an improved apparatus for the progressive tempering of wire by means of which the wire is automatically and uniformly tempered throughout its length.

While we have shown our invention in but one form, it will be obvious to those skilled in the art that it is not so limited, but is susceptible of various changes and modifications, without departing from the spirit thereof, and we desire, therefore, that only such limitations shall be placed thereupon as are imposed by the prior art or as are specifically set forth in the appended claims.

What we claim is:

1. In a wire tempering apparatus, means for progressively feeding and drawing the wire through a heating zone, a quenching tank and a tempering bath, tension means within the quenching tank and effective to maintain the wire straight during quenching, a reel upon which the tempered wire is wound and increasing in diameter with each succeeding layer of wire thereon, means for driving the reel, and means interposed between the driving means and the reel for maintaining the peripheral speed of the reeled wire constant.

2. In apparatus for the progressive tempering of wire, a frame, feeding and delivery rolls arranged toward the opposite ends of the frame, power means for driving the feeding and delivery rolls in synchronism to progressively draw the wire across the frame, means for heating the wire and arranged adjacent the feeding rolls, a quenching tank arranged beyond the heating means in the direction of travel of the wire, tension means within the quenching tank and effective to maintain the wire straight during quenching, a tempering bath arranged beyond the quenching tank in the direction of travel of the wire, a reel for winding the tempering wire and driven by the power means, and automatically adjustable friction power transmitting means between the power means and the reel for maintaining the rate of winding constant.

3. In apparatus for the progressive tempering of wire, a frame, feeding and delivery rolls arranged toward the opposite ends of the frame, power means for driving the feeding and delivery rolls in synchronism to progressively draw the wire across the frame, means for heating the wire and arranged adjacent the feeding rolls, a quenching tank arranged beyond the heating means in the direction of travel of the wire, tension means within the quenching tank and effective to maintain the wire straight during quenching, a tempering bath arranged beyond the quenching tank in the direction of travel of the wire, a reel for winding the tempered wire and driven by the power means, means embodying a friction clutch for transmitting power from the power means to the winding reel to drive the latter, a brake element for varying the effectiveness of the clutch to control the speed of the winding reel, and means controlled by the slack of the wire in its travel across the frame for controlling the brake element.

4. In apparatus for the progressive tempering of wire, a frame, feeding and delivery rolls arranged toward the opposite ends of the frame, power means for driving the feeding and delivery rolls in synchronism to progressively cause the wire to move along the frame, means for heating the wire and arranged adjacent the feeding rolls, a quenching tank arranged beyond the heating means in the direction of travel of the wire, tension means within the quenching tank and effective to maintain the wire straight during quenching, a tempering bath arranged beyond the quenching tank in the direction of travel of the wire, a reel for winding the tempered wire and driven by the power means, means embodying a friction clutch for transmitting power from the power means to the winding reel to drive the latter, a brake element for varying the effectiveness of the clutch to control the speed of the winding reel, and link and lever means operable by variation in the slack in the wire in its travel along the frame for varying the effectiveness of the brake element.

5. In apparatus for the progressive tempering of flat reed wire, a frame, feeding and delivery rolls arranged at opposite ends of the frame and disposed to maintain the wire edgewise of the frame, a delivery reel from which the wire to be tempered is unwound, an elongated heating element arranged adjacent the delivery rolls, a plurality of guide means for the wire arranged along the heating element and disposed to maintain the wire edgewise thereof, a quenching tank through which the heated wire passes, tension means within the quenching tank and effective to maintain the wire straight during quenching, a tempering bath adjacent the quenching tank, a winding reel for receiving the tempered wire from the delivery rolls, power means for driving the feeding and delivery rolls and winding reel, and means for co-ordinating the speed of the winding reel and feeding and delivery rolls to maintain the linear speed of the wire constant while being tempered.

6. In wire tempering apparatus for flat reed wire embodying means for progressively passing the wire being tempered across a heating element, through a quenching bath and then through a tempering bath, tension means within the quenching tank and effective to maintain the wire straight during quenching, and means for maintaining the narrow dimension of the wire in the same relative position throughout the operation.

7. In apparatus for tempering flat reed wire and embodying means for progressively passing the wire to be tempered across a heating flame, through a quenching bath and then through a tempering bath, guide means for maintaining the wire edgewise of the heating flame, tension means disposed within the quenching bath and embodying grooved retaining means to hold the wire edgewise therein, a winding reel for the tempered wire and the reel of wire increasing in diameter with each succeeding layer of wire thereon, power means for driving the winding reel, and means interposed between the power means and the winding reel for maintaining constant the linear speed of the wire being tempered.

8. In power operated apparatus for the progressive tempering of wire, the combination of a constant speed motor for driving the apparatus, spring biased means for retarding the travel of the wire while being tempered, a winding reel for the tempered wire and exerting a pull thereon in opposition to the spring means, the reel of wire increasing in diameter with each succeeding layer of wire thereon, means for driving the winding reel from the motor, and means interposed between the driving means and the reel to regulate the speed of the latter and maintain the linear speed of the wire constant.

9. In power operated apparatus for the progressive tempering of wire, the combination of a constant speed motor for driving the apparatus, spring biased means for retarding the travel of the wire while being tempered, a winding reel for the tempered wire and exerting a pull thereon in opposition to the spring means, the reel of wire increasing in diameter with each succeeding layer of wire thereon, means for driving the winding reel from the motor, means interposed between the driving means and the reel to regulate the speed of the latter and maintain the linear speed of the wire constant, and cam operated guide means for winding the wire evenly on the winding reel.

10. In a wire tempering apparatus embodying means for progressively heating the wire, quenching it and immersing it in a tempering bath, the combination of means for subjecting the wire to a constant speed linear pull through the apparatus, and means for subjecting the wire to a constant tension while in the tempering bath.

11. In a wire tempering apparatus embodying means for progressively heating the wire, passing it through a quenching tank and then through a tank containing a tempering bath, the combination of means for subjecting the wire to a linear pull through the quenching tank and tempering bath, and tension means disposed within the quenching tank to subject the wire to a constant tension in the tempering bath.

12. In a wire tempering apparatus embodying means for progressively heating the wire, passing it through a quenching tank and then through a tank containing a tempering bath, the combination of means for subjecting the wire to a linear pull through the quenching tank and tempering bath, tension means disposed within the quenching tank to subject the wire to a constant tension in the tempering bath, and means for varying the tension of the tension means.

13. In a wire tempering apparatus embodying means for progressively heating the wire, passing it through a quenching tank and then through a tank containing a tempering bath, the combination of means for subjecting the wire to a constant speed linear pull through the quenching tank and tempering bath, and tension means disposed within the quenching tank to subject the wire to a constant tension in the tempering bath, said tension means closely embracing the wire while in the quenching tank to maintain its symmetry.

14. In apparatus for tempering flat loom reed wire and embodying means for progressively heating the wire, passing it through a quenching tank and then through a tank containing a tempering bath, the combination of means for subjecting the wire to a constant speed linear pull through the quenching tank and tempering bath, guide means for maintaining the wire with its narrow dimension in the same relative position while being heated, and tension means within the quenching tank and comprising spring-pressed parallel bars extending from end to end of the tank and having longitudinal grooves closely embracing the wire to maintain its symmetry on sudden cooling.

15. In apparatus for tempering flat loom reed wire and embodying means for progressively heating the wire, passing it through a quenching tank and then through a tank containing a tempering bath, the combination of means for subjecting the wire to a constant speed linear pull through the quenching tank and tempering bath, guide means for maintaining the wire with its narrow dimension in the same relative position while being heated, and tension means within the quenching tank and comprising spring-pressed parallel bars extending from end to end of the tank and having longitudinal grooves closely embracing the wire to maintain its symmetry on sudden cooling, said parallel bars having the grooves in alignment with the guide means and maintaining the narrow dimension of the wire in the same relative position as the guide means.

16. In apparatus for tempering flat loom reed wire and embodying means for progressively heating the wire, passing it through a quenching tank and then through a tank containing a tempering bath, the combination of means for subjecting the wire to a constant speed linear pull through the quenching tank and tempering bath, guide means for maintaining the wire with its narrow dimension in the same relative position while being heated, tension means within the quenching tank and comprising spring pressed parallel bars extending from end to end of the tank and having longitudinal grooves closely embracing the wire to maintain its symmetry on sudden cooling, said parallel bars having the grooves in alignment with the guide means and maintaining the narrow dimension of the wire in the same relative position as the guide means, and means for varying the tension of the springs.

17. In apparatus for tempering flat loom reed wire and embodying means for feeding the wire successively across an elongated heating burner, through a quenching tank and then through a tempering bath, the combination of guide means arranged at intervals along the heating burner and having grooves therein to maintain the wire edgewise with respect to the burner, means for feeding the wire across the burner practically free from tension, tension means within the quenching tank, and means for exterting a constant speed linear pull on the wire from the quenching tank through the tempering bath, whereby it is subjected to a constant tension while being tempered.

18. In apparatus for tempering flat loom reed wire and embodying means for feeding the wire successively across an elongated heating burner, through a quenching tank and then through a tempering bath, the combination of guide means arranged at intervals along the heating burner and having grooves therein to maintain the wire edgewise with respect to the burner, means for feeding the wire across the burner practically free from tension, tension means within the quenching tank and embodying spring pressed parallel bars extending from end to end of the tank and having longitudinal grooves closely embracing the wire and maintaining its narrow dimension in the same relative position as in the guide means and its symmetrical shape upon being suddenly cooled, and means for exerting a constant speed linear pull on the wire from the quenching tank through the tempering bath, whereby it is subjected to a constant tension while being tempered.

19. In apparatus for tempering flat loom reed wire and embodying means for feeding the wire successively across an elongated heating burner, through a quenching tank and then through a tempering bath, the combination of a downwardly sloping frame over which the wire is treated while traveling in a downward direction, guide means supported by the frame and arranged at intervals along the heating burner and having grooves therein to maintain the wire edgewise with respect to the burner, means for feeding the wire across the burner practically free from tension, tension means within the quenching tank and embodying spring pressed parallel bars extending from end to end of the tank and having longitudinal grooves closely embracing the wire and maintaining its narrow dimension in the same relative position as in the guide means and its symmetrical shape upon being suddenly cooled, and means for exerting a constant speed linear pull on the wire from the quenching tank through the tempering bath, whereby it is subjected to a constant tension while being tempered.

20. In apparatus for tempering flat loom reed wire and embodying a frame having mounted thereon successively a heating burner, a quenching tank and a tank containing a tempering bath, the combination of feeding and delivery rolls for the wire to be tempered and mounted respectively in front of the burner and to the rear of the tempering bath in the direction of travel of the wire, constant speed power means for driving the feeding and delivery rolls in synchronism, a winding reel for the tempered wire arranged to the rear of the delivery rolls and the reel of wire increasing in diameter with each succeeding layer of wire thereon, tension means within the quenching tank and effective to maintain the wire straight during quenching, means for driving the winding reel from the power means and including a friction clutch, a brake controlling the action of the friction clutch to control the rate of power transmitted, and means governed by slack in the wire ahead of the tension means for controlling the action of the brake.

21. Apparatus as set forth in claim 20, wherein the frame slopes downward from feeding to delivery end to minimize tension in the wire while being heated.

22. In apparatus for the progressive tempering of flat reed wire, a frame, feeding and delivery rolls arranged at opposite ends of the frame and disposed to maintain the wire edgewise of the frame, a delivery reel from which the wire to be tempered is unwound, an elongated heating element arranged adjacent the delivery rolls, a plurality of guide means for the wire arranged along the heating element and disposed to maintain the wire edgewise thereof, a quenching tank through which the heated wire passes, tension means within the quenching tank and effective to maintain the wire straight during quenching, a tempering bath adjacent to quenching tank, a winding reel for receiving the tempered wire from the delivery rolls, power means for driving the feeding and delivery rolls and winding reel, means for coordinating the speed of the winding reel and feeding and delivery rolls to maintain the linear speed of the wire constant while being tempered, and cam operated guide means for winding the wire evenly on the winding reel.

In testimony whereof we affix our signatures.

ARTHUR W. HARRIS.
FREDERICK M. SUCHKE.
JOHN L. KING.